United States Patent [19]

Horaguchi et al.

[11] Patent Number: 5,269,093
[45] Date of Patent: Dec. 14, 1993

[54] METHOD AND APPARATUS FOR CONTROLLING PLANT GROWTH WITH ARTIFICIAL LIGHT

[75] Inventors: Kimitoshi Horaguchi, Sakai; Masaaki Morita, Hirakata; Katsusuke Murakami, Nara; Ichiro Aiga, Sakai, all of Japan

[73] Assignee: Matsushita Electric Industrial Co., Ltd., Osaka, Japan

[21] Appl. No.: 801,689

[22] Filed: Dec. 2, 1991

[30] Foreign Application Priority Data

Nov. 30, 1990 [JP] Japan ................................. 2-338052
Nov. 30, 1990 [JP] Japan ................................. 2-338057

[51] Int. Cl.$^5$ ............................................. A01C 1/00
[52] U.S. Cl. .............................. 47/1.01; 47/DIG. 6
[58] Field of Search ........... 47/1.01, DIG. 6, DIG. 8, 47/17, 39

[56] References Cited

U.S. PATENT DOCUMENTS

| | | | |
|---|---|---|---|
| 4,060,933 | 12/1977 | Kadkade | 47/DIG. 6 |
| 4,146,993 | 4/1979 | Freeman, Sr. | 47/DIG. 6 |
| 4,749,916 | 6/1988 | Yamazaki et al. | 47/DIG. 6 |
| 4,761,913 | 8/1988 | Henningsson et al. | |
| 4,788,793 | 12/1988 | Kadkade | 47/DIG. 6 |
| 4,952,443 | 8/1990 | Gravesse | |
| 5,012,609 | 5/1991 | Ignatius et al. | 47/DIG. 6 |
| 5,058,316 | 10/1991 | Watari | 47/DIG. 6 |

FOREIGN PATENT DOCUMENTS 62-51935 3/1987 Japan .
1-63318 3/1989 Japan .

*Primary Examiner*—Ramon S. Britts
*Assistant Examiner*—Joanne C. Downs
*Attorney, Agent, or Firm*—Ratner & Prestia

[57] ABSTRACT

Disclosed are a method and an apparatus for controlling the plant growth with artificial light in plant factories, atria, etc. The stem extension and the leaf/stem dry weight ratio can be controlled artificially by the ratio of the additional far-red irradiation (700–800 nm) to the photosynthetically active radiation (PAR 400–700 nm). In a chamber for cultivating plants, an artificial lighting source, having 3-band fluoscent lamps for PAR and far-red fluoscent lamps for far-red radiation, is employed.

2 Claims, 3 Drawing Sheets

METHOD AND APPARATUS FOR CONTROLLING PLANT GROWTH WITH ARTIFICIAL LIGHT

BACKGROUND OF THE INVENTION

1. Field of the invention

This invention relates generally to the cultivation of plants under artificial light, and pertains more particularly to a commercially feasible method and apparatus for effectively controlling plant growth with the spectral characteristics of the lighting sources.

2. Description of the Prior Art

In growing plants, whether the culture be with soil or without soil, various factors must be favorable in order to encourage plant growth. The conditions such as supply of nurtrients, temperature, relative humidity and $CO_2$ concentration in atmosphere must be favorable. Light conditions, of course, must be favorable, top.

Recently, there has been an increase in the number of greenhouses or plant factories. In these plant factories, plants are grown under natural lighting, artificial lighting or mixture of them. Among them, artificial lighting is most favorable to cultivate the plants efficiently and effectively in plant factories.

Metal halide lamps, high-pressure sodium lamps and fluorescent lamps are generally used in these plant factories.

Under such artificial lighting conditions, the growth of plants can be controlled by changing the spectral characteristics of the lighting sources used.

Not only the quantity but also the quality of the plants produced must be regarded as important. In the market, there is a large demand for qualities of vegetables. For instance, vegetables durable for transportation and soft vegetables for patients in hospital are usually demanded.

The number of photon incident on plants depends on the leaf area and the geometrical arrangements of leaves in the plant factory. Leaf areas and stem extensions are also important factors relating to efficiency in photosynthesis in plants. So, it is important to consider the photomorphogenesis in the plant factory.

It has been known that radiation between 400-700 nm in wavelength is effective for plant photosynthesis and that radiation longer than 700 nm in wavelength is effective for plant photomorphogenesis such as stem extensions, leaf areas and so on.

In past, however, such quantities as fresh weight or dry weight of plants have been considered in the mass production. The lighting sources for photosynthesis have been the main interest of development and the photomorphogenesis have been left out of consideration in the plant factory.

SUMMARY OF THE INVENTION

An important object of the present invention is to provide a method for effectively and efficiently controlling plant growth under artificial lighting.

Another object of the invention is to provide an apparatus for effectively and efficiently controlling plant growth under artificial lighting.

Further, another object of the invention is to provide a method and an apparatus for the promotion of plant growth under artificial lighting.

An additional object of the invention is to provide a method and an apparatus for improving the morphology of plants being grown, so that the form and the structure of the plants will be enhanced.

A further additional object of the invention is to provide a method and an apparatus for dwarfing of plant growth, so that the physical dimensions of a growth chamber in which the plants are grown will be reduced.

Another object of the invention is to provide a lighting fixture for growth chambers that will be relatively inexpensive to manufacture and to maintain.

DESCRIPTION OF THE PREFERRED EMBODIMENT

Figure 1:
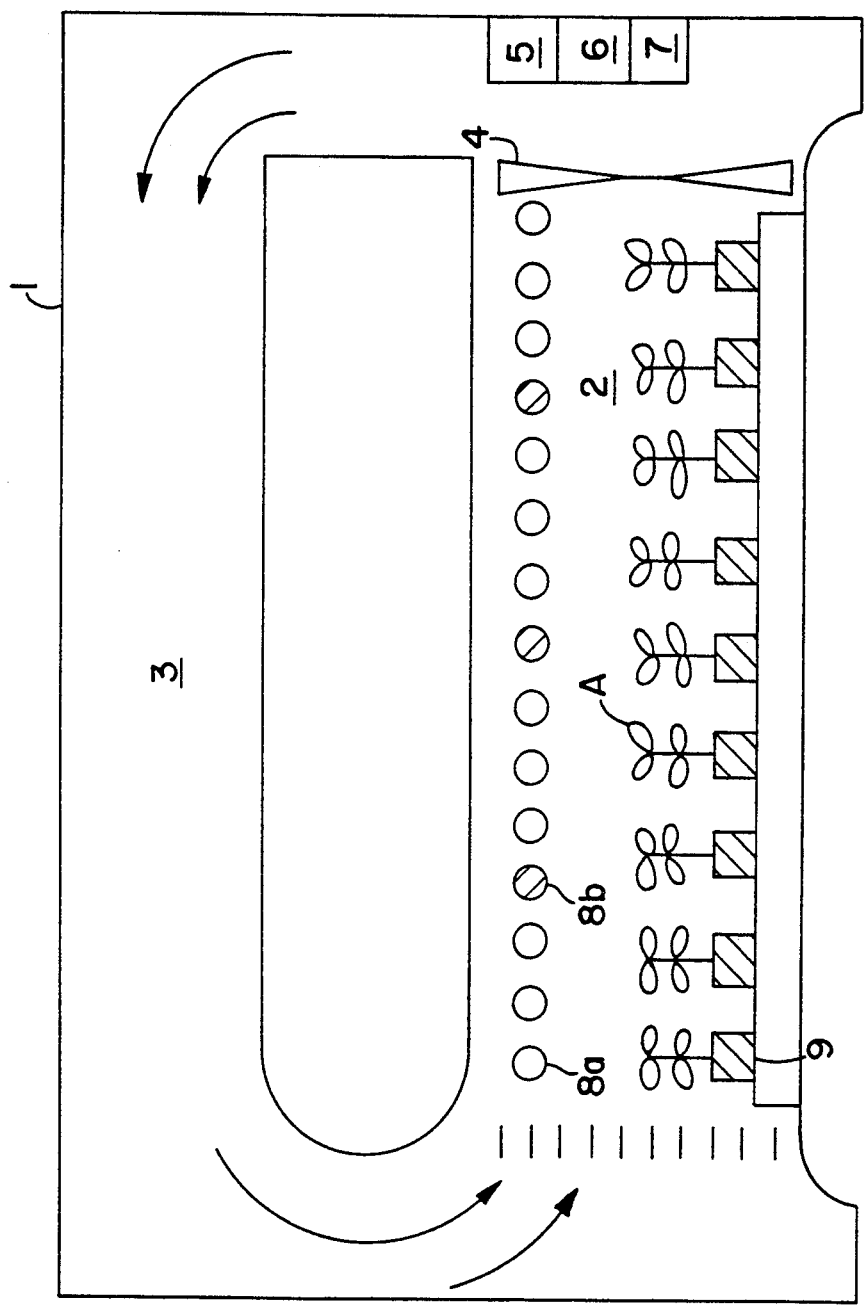
FIG. 1 is a schematic diagram of an apparatus embodying the present invention.
Figure 2:
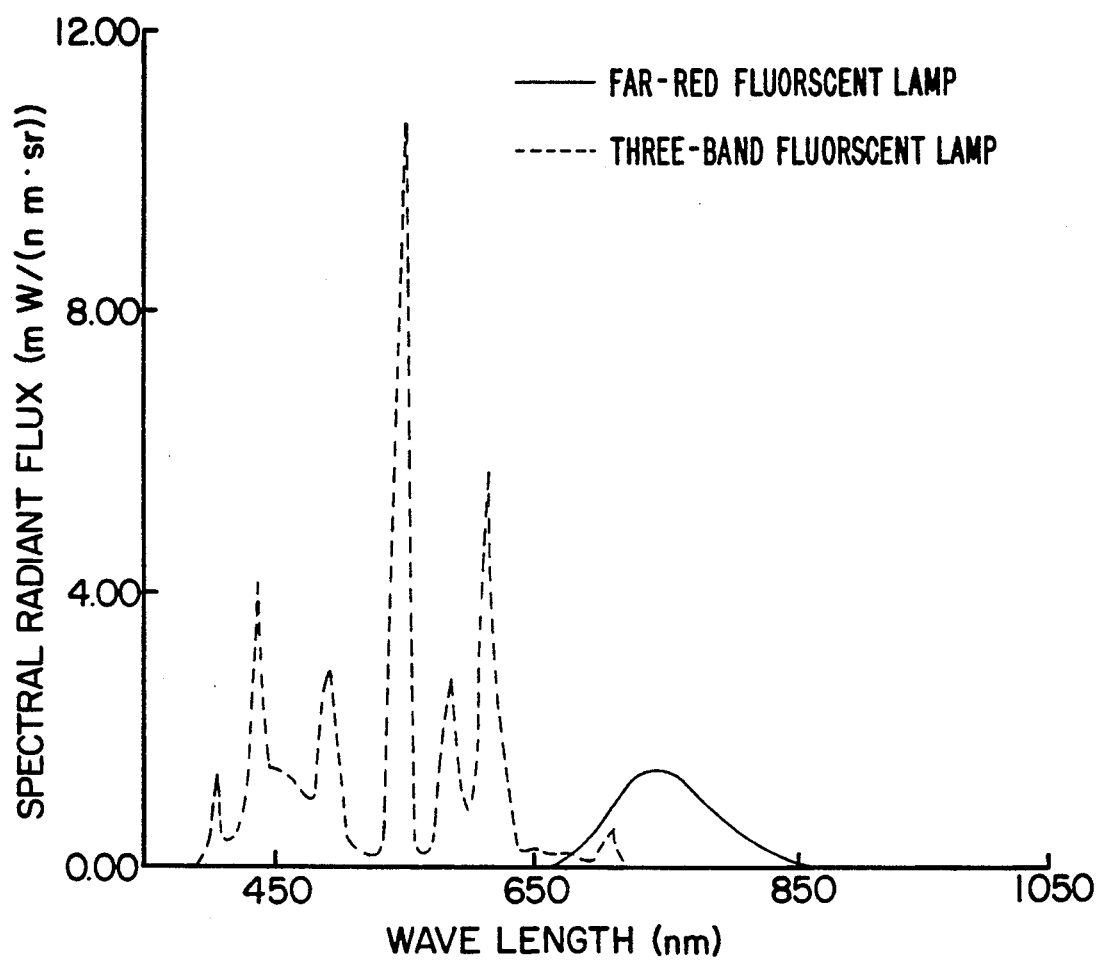
FIG. 2 shows the spectral energy distributions of lighting sources.
Figure 3:
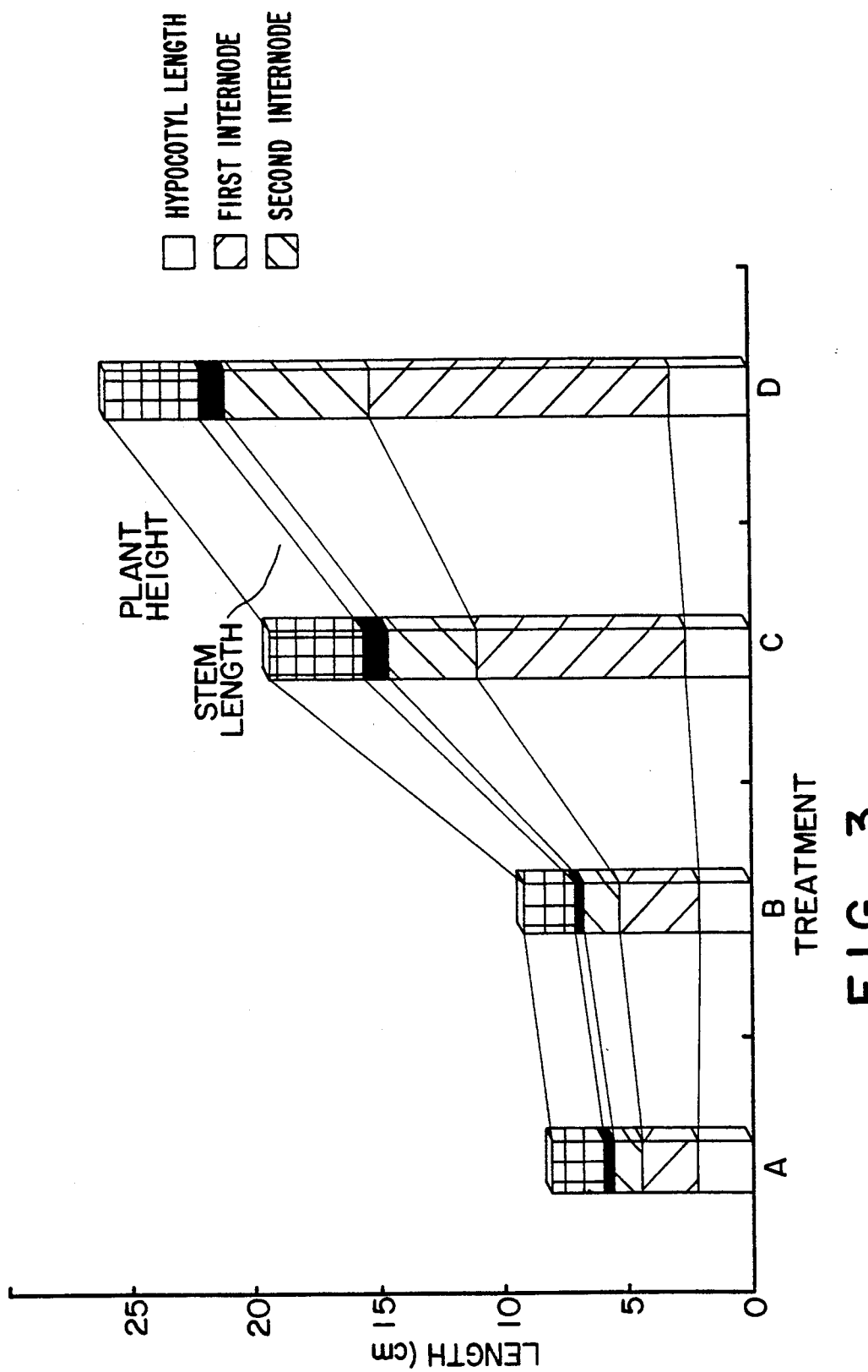
FIG. 3 shows the stem elongation of plants, brought about by keeping them for 8 days under the four different lighting conditions.

FIG. 1 illustrates an example of the apparatus of the present invention.

In the growth chamber 1, there are a cultivation room 2 and a wind tunnel 3 with an electric fan 4 for air circulation. The temperature, relative humidity and $CO_2$ concentration in the growth chamber are controlled by the controlling means 5, 6 and 7 respectively. The plants are settled on a styrofoam board 9 floating in the nutrient solution.

Four units of the luminariry specially made for this example, in which 20 W type, and 55 W type fluorescent lamps can be set up with up to 13 lamps with a free combination of the two types were installed in the growth chamber.

Table I shows the photon flux density and the ratio of photon flux density within the wavelength region for the respective treatments.

TABLE I

Three-band fluorescent lamps (55 W) 8a were used as the main lighting source, and the additional far-red (FR) fluorescent lamps (20 W) 8b were used in each treatment. As shown in Table 1, one(B), five(C) and nine(D) bulbs were used. In the control treatment(A), only the main lighting source was used.

In order to keep the same temperature condition between the treatments, the luminaries which radiate no FR light were equipped with the 20 W fluoresent lamps covered by black paper. The plants were irradiated for twenty four hours continuously. The photosynthetically active photon flux density (PPFD) was measured by a photometer (LI-185, manufactured by Li-cor Co.) and by a photosensor (LI-190S, manufactured by Li-cor Co.). The PPFD was kept at 200 $\mu$mol m$-2 \cdot$s$-1$ in each treatment.

The seedling culture was conducted under the above described lighting conditions using 3-band fluorescent lamps (FPL55SSEX-N, 5000 K manufactured by Matsushita Erectric Industrial Co.)

The plants were grown in the growth chamber with an air temperature of 25° C. and a humidity of 70% RH.

The seeds of the sunflower (Helianthus annuus L. Cv. Russian Mammoth) were collected from the plant with cultivation repeated 7 times in an isolated field. Following the imbibition in water for one day, the seeds were sown in a rockwool media. Four days after sowing, a commercial nutrient solution (Otsuka House No. 1 and No. 2) was used as the fertilizer for the media. The sunflowers were successfully grown hydroponically. Under the luminaries, the apparatus for hydroponics were set up and the seedlings were transplanted from the preculture area of rockwool media.

The plants were settled on a styrofoam board floating in the nutrient solution.

Fifty plants were grown in each treatment. The plants in each treatment were grown using 12 liters of the commercial nutrient solution.

The root area was fed by air bubbles using air pumps.

The growth parameters were measured with 10 plants at the start and with 5 plants in 3, 6 and 8 days after planting. The top fresh weight, stem length, stem diameter, leaf numbers and total leaf area were measured. The dry weight of leaves, stems and tops(the upper plant body over the ground) were measured after drying at 80° C. in a forced-air oven for 2 days.

The data were taken using variance analysis. Differences between the mean values were determined by Duncan's multiple range test $p=5\%$. The growth characteristics of the plants in the four treatments are shown in Table II.

TABLE II

Three days after planting, the top fresh weight, and stem dry weight increased significantly in treatments C and D. In six and eight days after planting, the differences between the different treatments increased.

Leaf dry weight showed no significant differences in the three day planting but in six and eight days it increased significantly in the treatments C and D.

The changes in morphological parameters are shown in Table III.

TABLE III

The number of leaves tends to increase in FR added treatments in 6 days after planting. The stem diameter also tends to increase. The leaf area increases significantly in the treatments C and D after 6 days of planting. The most effective change was observed in the stem extension.

The stem length was increased significantly with the FR irradiation for 3 days after planting in the treatments C and D. The longer the treatments, the greater became the differences between the different treatments. With the treatment by FR irradiation for 8 days after planting, the stem length extended 3.8 times more in the treatment D than in the treatment A, and the leaf/stem dry weight ratio was 2.7 in D and 5.8 in A.

As the FR irradiation increases in treatment, the stem length and the internode length were extended. So, the plant height was increased and the leaf area became larger. Since the photosynthesis caused by FR irradiation can be ignored, the increase in dry weight was considered to be caused by an increase in the photosynthesis that was possibly caused by the shortened distance between the luminaires and the plants.

It might also be caused by the elongated internode length which resulted in decreased mutual-shading and an increase of the leaf area, enabling to accept more photons.

In accordance with this embodiment of the present invention, as mentioned above, the plant morphological characteristics such as the stem length and the leaf form, can be controlled easily. Also, the production of the edible or the useful parts of the plants can be easily controlled by the present invention.

This invention can be applied to design artificial lighting conditions of plant factories or indoor atria, to avoid elongation in seedlings production. The physical dimensions of a growth chamber in which the plants are grown will be reduced by the dwarfing of plant growth.

TABLE I

| | Photon flux density and ratio with wavelength regions in each treatment. | | | | | |
|---|---|---|---|---|---|---|
| | Additional far-red lamps | Photon flux density ($\mu mol \cdot m^{-2} \cdot s^{-1}$) | | Photon flux density ratio | | |
| Treatment | | 400–700 nm | 700–800 nm | $660 \pm 5$ nm /$730 \pm 5$ nm | 600–700 nm /700–800 nm | 400–700 nm /700–800 nm |
| A | 0 | 200 | 9.3 | 14.76 | 6.78 | 21.62 |
| B | 1 | 200 | 25.6 | 0.83 | 2.48 | 7.81 |
| C | 5 | 200 | 50.1 | 0.36 | 1.28 | 3.99 |
| D | 9 | 200 | 107.1 | 0.17 | 0.63 | 1.87 |

TABLE II

| | | Change of growth characteristics by additional far-red irradiation | | | | |
|---|---|---|---|---|---|---|
| Days after planting | Treatment | Fresh weight (g) Top | Dry weight (g) | | | |
| | | | Leaf | Stem | Top | Leaf/stem |
| 0 | — | 1.2 | 0.1 | 0.02 | 0.1 | — |
| 3 | A | 2.9 | 0.2 | 0.03 | 0.3 | 7.7 |
| 3 | B | 2.6 | 0.2 | 0.03 | 0.2 | 7.3 |
| 3 | C | 3.7 | 0.3 | 0.04 | 0.3 | 6.8 |
| 3 | D | 3.6 | 0.2 | 0.05 | 0.3 | 4.8 |
| 6 | A | 6.0 | 0.5 | 0.08 | 0.6 | 6.4 |
| 6 | B | 6.4 | 0.5 | 0.09 | 0.6 | 5.7 |
| 6 | C | 9.1 | 0.7 | 0.17 | 0.9 | 4.0 |
| 6 | D | 9.5 | 0.7 | 0.20 | 0.9 | 3.3 |
| 8 | A | 8.8 | 0.8 | 0.14 | 0.9 | 5.8 |
| 8 | B | 10.4 | 0.8 | 0.16 | 1.0 | 5.3 |
| 8 | C | 14.3 | 1.2 | 0.32 | 1.5 | 3.7 |
| 8 | D | 16.7 | 1.3 | 0.46 | 1.7 | 2.7 |

TABLE III

| | Changes of morpholica parameters by additional far-red irradiation | | | | |
|---|---|---|---|---|---|
| Days after planting | Treatment | number of leaves | Leaf area (cm$^2$) | Plant diameter (cm) | Stem length (cm) |
| 0 | — | 4.0 | 17.6 | 0.25 | 2.4 |
| 3 | A | 6.2 | 61.4 | 0.32 | 3.1 |
| 3 | B | 6.0 | 57.9 | 0.30 | 3.3 |
| 3 | C | 6.6 | 79.4 | 0.34 | 5.4 |
| 3 | D | 6.6 | 68.8 | 0.34 | 6.2 |
| 6 | A | 8.8 | 129.9 | 0.42 | 5.1 |
| 6 | B | 8.2 | 135.0 | 0.46 | 5.5 |
| 6 | C | 9.6 | 196.0 | 0.47 | 12.1 |
| 6 | D | 9.6 | 191.0 | 0.51 | 13.7 |
| 8 | A | 10.8 | 199.7 | 0.48 | 6.0 |
| 8 | B | 10.2 | 220.0 | 0.54 | 7.1 |
| 8 | C | 12.2 | 308.3 | 0.55 | 15.6 |
| 8 | D | 12.4 | 314.4 | 0.55 | 22.1 |

What is claimed is:

1. An apparatus for controlling growth of plants, comprising:
   a growth chamber to contain the plants,
   a lighting fixture including a plurality of light sources for irradiating the plants,
   wherein each of said plurality of light sources of said lighting fixture is switched and controlled and said plurality of light sources generate light wherein a ratio of photon flux density in a first range of 660±5 nm to 730±5 nm is 0.1 to 15.0, in a second range of 600-700 nm to 700-800 nm is 0.5 to 7.0, and in a third range of 400-700 nm to 700-8000 nm is 1.0 to 22.0.

2. An apparatus in accordance with claim 1 in which said lighting fixture is comprised of 3-band fluorescent lamps and far-red fluorescent lamps.

* * * * *